(12) United States Patent
Poetker et al.

(10) Patent No.: US 8,275,221 B2
(45) Date of Patent: *Sep. 25, 2012

(54) EVALUATING SUBJECT INTERESTS FROM DIGITAL IMAGE RECORDS

(75) Inventors: Robert B. Poetker, Penfield, NY (US);
Anthony Scalise, Fairport, NY (US);
Kevin R. DeLong, Victor, NY (US);
Andrew C. Blose, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/235,737

(22) Filed: Sep. 19, 2011

(65) Prior Publication Data

US 2012/0008876 A1    Jan. 12, 2012

Related U.S. Application Data

(63) Continuation of application No. 12/129,218, filed on May 29, 2008, now abandoned.

(51) Int. Cl.
*G06K 9/54* (2006.01)

(52) U.S. Cl. ........................................ 382/305

(58) Field of Classification Search ........... 382/305–306
See application file for complete search history.

(56) References Cited

U.S. PATENT DOCUMENTS

| | | | |
|---|---|---|---|
| 5,640,468 A | 6/1997 | Hsu | |
| 5,796,945 A * | 8/1998 | Tarabella | 709/219 |
| 6,205,231 B1 | 3/2001 | Isadore-Barreca et al. | |
| 6,216,133 B1 | 4/2001 | Masthoff | |
| 6,539,375 B2 | 3/2003 | Kawasaki | |
| 6,785,421 B1 | 8/2004 | Gindele et al. | |
| 6,810,149 B1 * | 10/2004 | Squilla et al. | 382/224 |
| 6,847,733 B2 * | 1/2005 | Savakis et al. | 382/225 |
| 6,915,011 B2 * | 7/2005 | Loui et al. | 382/224 |
| 7,110,575 B2 | 9/2006 | Chen et al. | |
| 7,142,697 B2 | 11/2006 | Huang et al. | |
| 7,218,759 B1 | 5/2007 | Ho et al. | |
| 7,340,095 B2 * | 3/2008 | Kaneko et al. | 382/181 |
| 7,477,805 B2 * | 1/2009 | Ohtsuka et al. | 382/305 |
| 7,746,512 B2 * | 6/2010 | Yamakado et al. | 358/474 |
| 2001/0041020 A1 | 11/2001 | Shaffer et al. | |
| 2003/0101104 A1 | 5/2003 | Dimitrova et al. | |
| 2003/0236718 A1 | 12/2003 | Yang et al. | |
| 2005/0018216 A1 * | 1/2005 | Barsness et al. | 358/1.6 |
| 2006/0078201 A1 | 4/2006 | Kim et al. | |
| 2006/0173746 A1 | 8/2006 | Cooper et al. | |
| 2006/0251339 A1 | 11/2006 | Gokturk et al. | |
| 2006/0253491 A1 | 11/2006 | Gokturk et al. | |
| 2006/0268007 A1 | 11/2006 | Gopalakrishnan | |
| 2007/0009178 A1 * | 1/2007 | Kim et al. | 382/276 |
| 2007/0189579 A1 | 8/2007 | Crookham et al. | |

(Continued)

*Primary Examiner* — Jingge Wu
(74) *Attorney, Agent, or Firm* — Raymond L. Owens (57) ABSTRACT

A method of evaluating a user subject interest is based at least upon an analysis of a user's collection of digital image records and is implemented at least in part by a data processing system. The method receives a defined user subject interest, receives a set of content requirements associated with the defined user-subject-interest, and identifies a set of digital image records from the collection of digital image records each having image characteristics in accord with the content requirements. A subject-interest trait associated with the defined user-subject-interest is evaluated based at least upon an analysis of the set of digital image records or characteristics thereof. The subject-interest trait is associated with the defined user-subject-interest in a processor-accessible memory.

4 Claims, 9 Drawing Sheets

U.S. PATENT DOCUMENTS

| | | |
|---|---|---|
| 2008/0104225 A1 | 5/2008 | Zhang et al. |
| 2008/0205772 A1* | 8/2008 | Blose et al. .................. 382/225 |
| 2009/0150330 A1* | 6/2009 | Gobeyn et al. .................... 707/1 |
| 2009/0161962 A1* | 6/2009 | Gallagher et al. ............ 382/203 |
| 2011/0150366 A1* | 6/2011 | Yoda .............................. 382/305 |

* cited by examiner

FIG. 9

EVALUATING SUBJECT INTERESTS FROM DIGITAL IMAGE RECORDS

CROSS REFERENCE TO RELATED APPLICATIONS

This application is a continuation of prior U.S. patent application Ser. No. 12/129,218, filed May 29, 2008, now abandoned which is hereby incorporated herein by reference in its entirety.

FIELD OF THE INVENTION

This invention generally relates to image analysis techniques and more particularly relates to methods for evaluating user subject interests from a collection of digital image records.

BACKGROUND

There is much that can be learned or inferred about an individual based on that person's collection of images, including hobbies and frequent activities, travel and vacation spots, pets, family, friends, and other interests. This type of information can be of particular interest to advertisers or to anyone soliciting funds or support. By learning about a person through their digital image records, an advertiser can more closely target sales, marketing, and promotional approaches to reach an interested audience.

Although it is recognized that much can be learned about a person's subject interests from their collection of digital image records, conventional techniques for obtaining this information remain fairly simplistic and have significant shortcomings. Techniques exist for obtaining semantic information from image data content for one or more images. For example, there are techniques, familiar to those skilled in the image analysis arts, for readily detecting people, animals, and various types of objects in a digital image. However, there is more to learning about a person's subject interests than simply decomposing image content into mere data units or labels for objects in the image and mechanically associating those objects with the user. Subject interests are more accurately learned from the images a person captures at various times and have at least some probabilistic relation to factors such as when and where pictures are captured, how often a particular person, place, event, or object recurs in the image collection, which people or objects tend to appear within the same images or in images taken within the same chronological event, and so on. A more accurate evaluation of user subject interests can help advertisers and others to more effectively relate their message, appeal, service, or product offering to an individual user.

There is, then, a need for a more systematic and robust approach for obtaining information about user subject interests from a user's collection of digital image records.

SUMMARY

The above-described problem is addressed and a technical solution is achieved in the art by systems and methods for evaluating user subject interests from a collection of digital image records, according to various embodiments of the present invention.

According to some embodiments, the present invention provides a method for evaluating a user subject interest based at least upon an analysis of a user's collection of digital image records. The method is implemented at least in part by a data processing system and includes receiving a defined user subject interest; receiving a set of content requirements that are associated with the defined user-subject-interest; identifying a set of digital image records from the collection of digital image records, each deemed to have image characteristics in accord with the content requirements; evaluating a subject-interest trait that is associated with the defined user-subject-interest based at least upon an analysis of the set of digital image records or characteristics thereof; and associating the evaluated subject-interest trait with the defined user-subject-interest in a processor-accessible memory.

In some embodiments, the set of digital image records includes fewer digital image records than does a superset of digital image records, wherein the superset of digital image records includes fewer digital image records than the collection of digital image records. The step of identifying the set of digital image records includes: first, identifying the superset of digital image records from the collection of digital image records, each having image characteristics in accord with some, but not all, of the content requirements and then identifying the set of digital image records from the superset of digital image records as those having image characteristics in accord with all of the content requirements.

The subject-interest trait can be a level of interest exhibited by the user in the defined user-subject-interest. In one embodiment, the defined user subject-interest is a sport and the subject-interest trait is a kind of equipment the user prefers when playing the sport. In an embodiment wherein the user subject-interest is an activity, the subject-interest trait relates to characteristics of user involvement in the activity. At least some of the content requirements in the set of content requirements may be received from a third-party advertiser.

The step of evaluating the subject-interest trait can comprise obtaining contextual information about time, location, or both time and location related to the set of digital image records; identifying an image analysis utility based at least upon an analysis of the obtained contextual information; and analyzing an image in the set of digital image records using at least the identified image analysis utility.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION

Embodiments of the present invention evaluate user subject interests from an analysis of a user's collection of digital image records. In this regard, a predetermined set of content requirements that is associated with user subject interests is received, for example, by a data processing system. A set of digital image records is then identified from the wider collection of digital image records, where digital image records in this set have characteristics that are in accord with the content requirements. Traits of the user subject interest can then be evaluated based at least upon analysis of the characteristics of this set of digital image records.

Using an embodiment of the present invention, for example, an advertiser who is interested in reaching a target audience provides, as input to the process, information related to one or more user subject interests that characterize that audience. For a sporting-goods retailer, this information may relate to an interest in camping or hiking, for example. Content requirements that are associated with this outdoor-activities user-subject-interest can be provided by the advertiser or can be generated by a server or other processor that carries out the evaluation performed by various embodiments. The content requirements are used to identify a particular set of image records from the user's collection that can help to provide the information needed for a more precise characterization of the user-subject-interest. For example, content requirements may be directed to more closely defining the level of interest in outdoor activities, to ascertaining various subject-interest traits such as relatively how much interest the user is likely to have in climbing or other activities that are more physically demanding, or whether or not the user has particular favorite state or national parks that are more frequently visited. Subject-interest traits with this kind of information are gleaned from the subset of images and can be associated with the user subject-interest, thereby "populating" the user-subject-interest for a particular user. Subsequent product or service offerings from this advertiser can then be more closely tailored to the needs of this user, making it more likely that the advertiser will find a ready recipient of a marketing message.

The phrase "digital image record," as used herein, is intended to include digital still images either directly from capture or from scanned prints, as well as digital video images. Also, it should be noted that, unless otherwise explicitly noted or required by context, the word "or" is used in this disclosure in a non-exclusive sense.

The various functions and processes described herein may be implemented on a computer or other type of control logic processor and set up as a set of stored instructions in "software" or "software programs". Those skilled in the art will recognize, however, that the equivalent functions of such software can also be readily executed in hardware.

System Hardware

Figure 1:
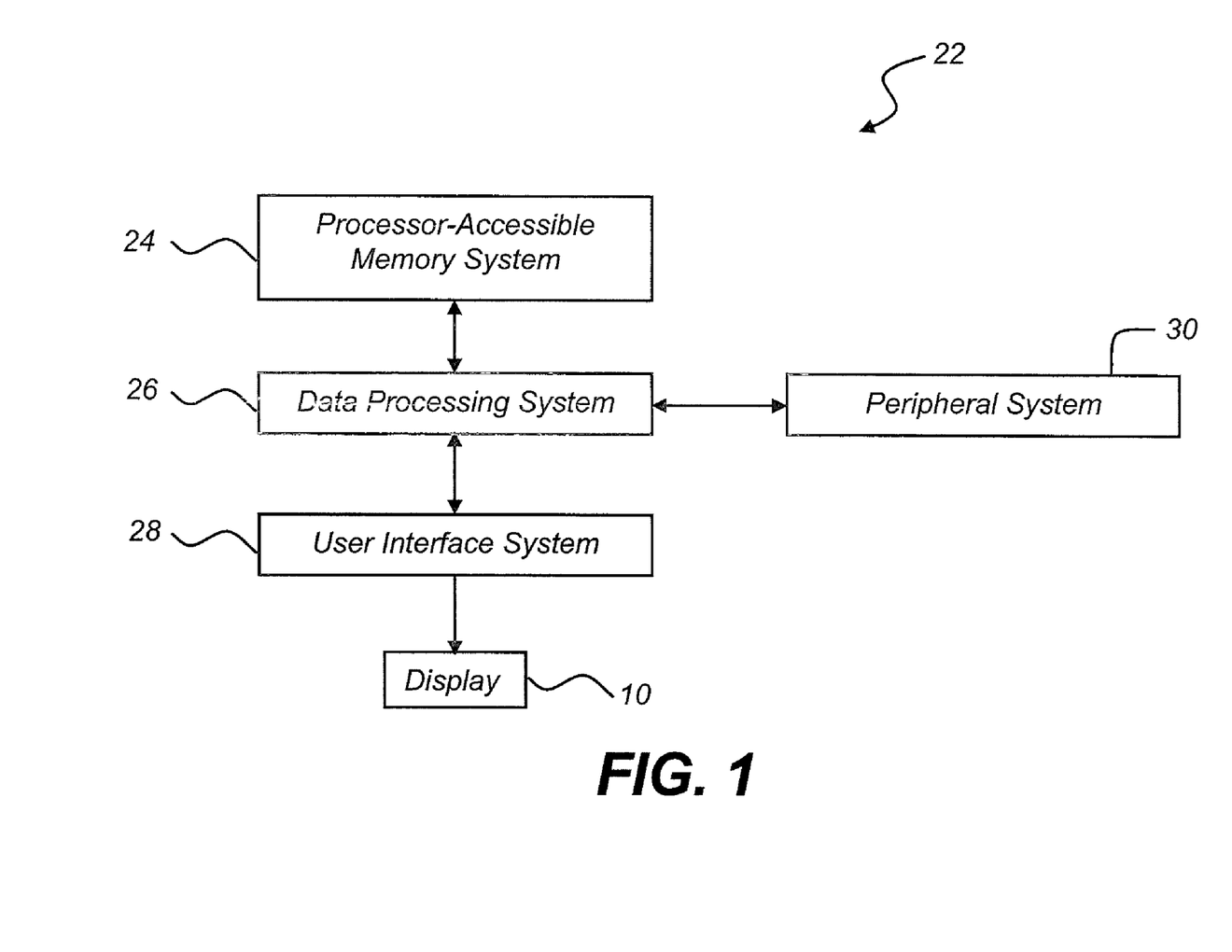
FIG. 1 illustrates a system for evaluating user's subject interests according to an embodiment of the present invention.

FIG. 1 illustrates a system 22 for evaluating user subject interests from analysis of a user's collection of digital image records, according to an embodiment of the present invention. The system 22 includes a data processing system 26, a peripheral system 30, a user interface system 28, and a processor-accessible memory system 24. The processor-accessible memory system 24, the peripheral system 30, and the user interface system 28 are communicatively connected to the data processing system 26. The data processing system 26 includes one or more data processing devices that implement the processes of the various embodiments of the present invention, including the example processes of FIGS. 2, 6, and 7 described herein.

The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Figure 2:
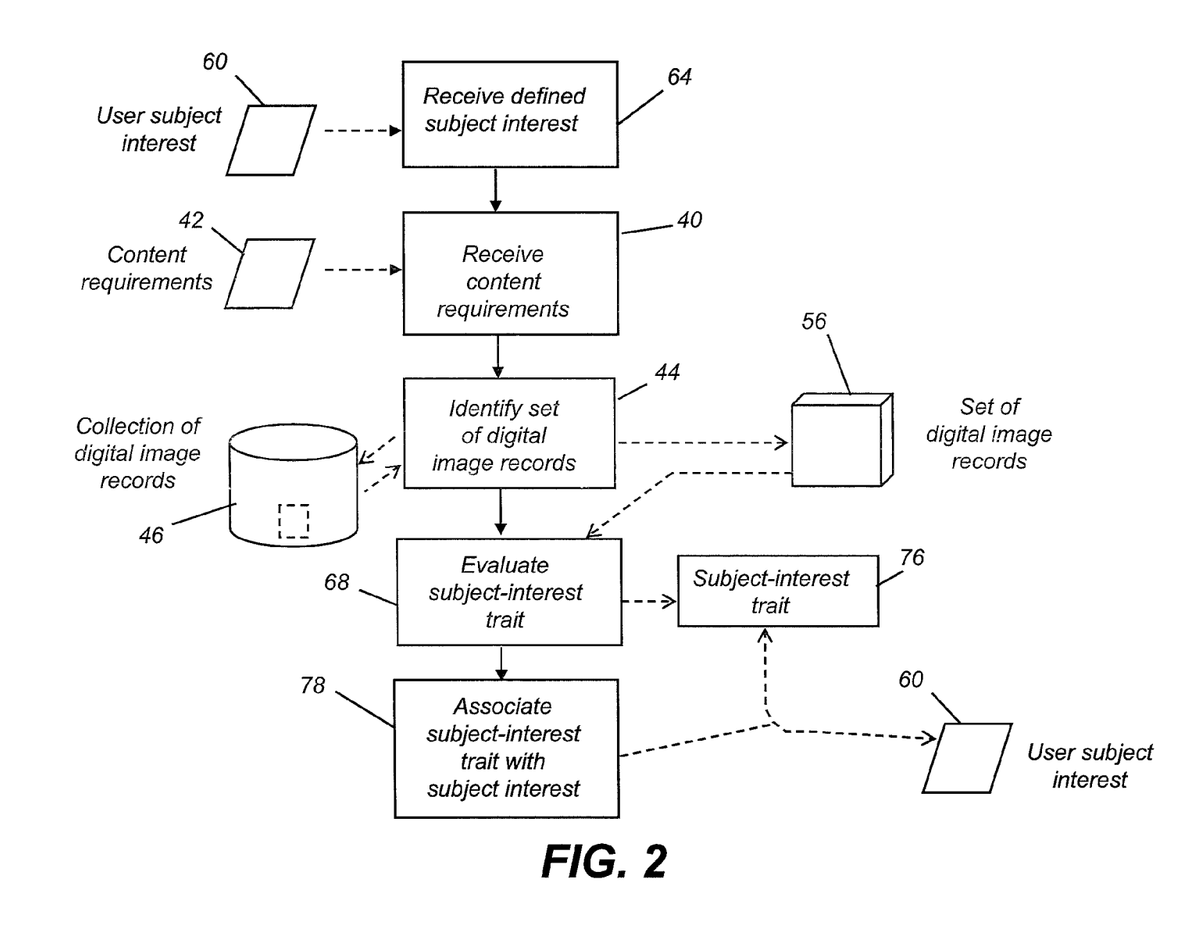
FIG. 2 is a block diagram of steps for evaluating a user subject interest from digital image records for that user according to an embodiment of the present invention.
Figure 6:
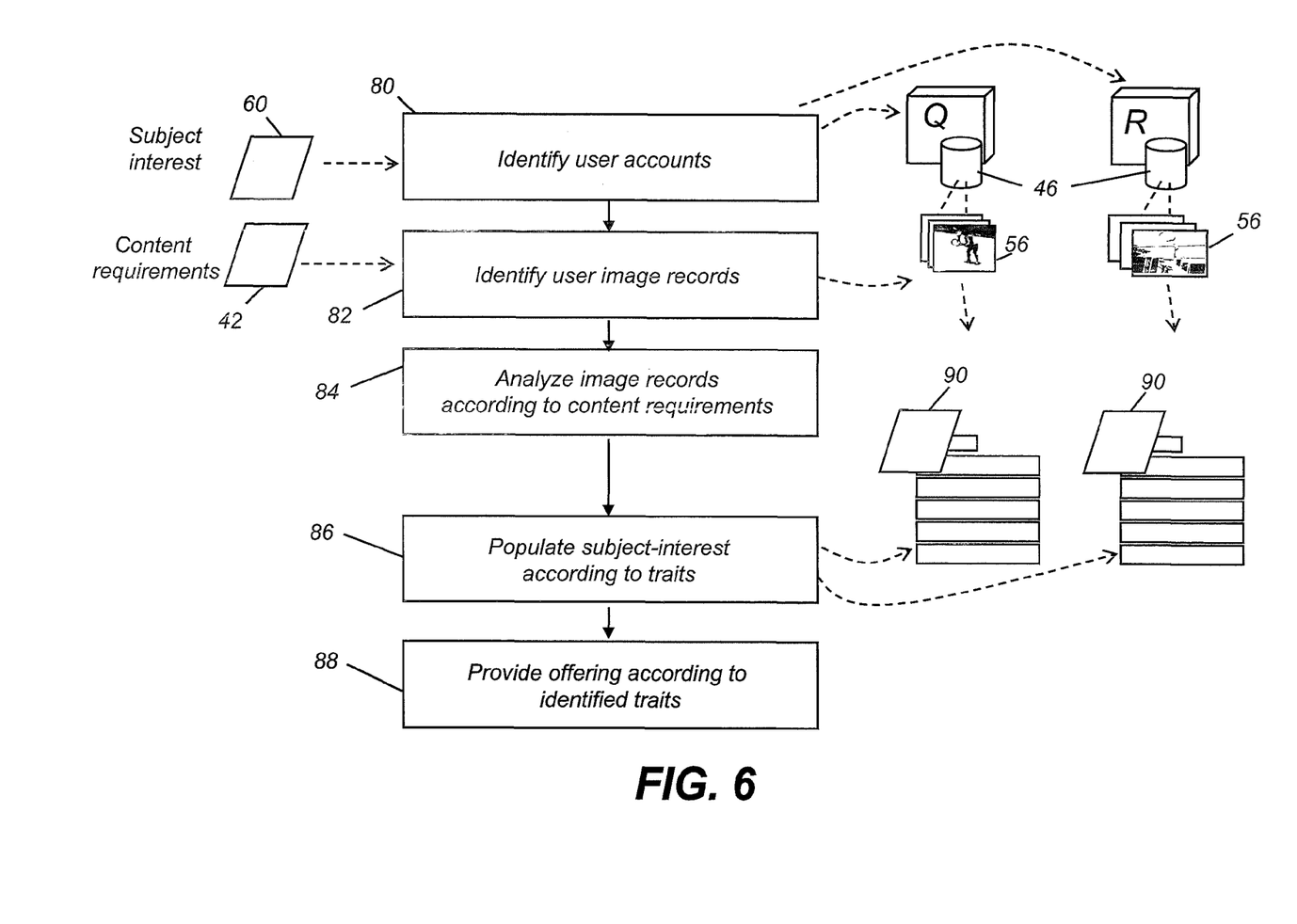
FIG. 6 is a logic flow diagram that shows how an embodiment of the present invention can be used by an advertiser or other third party.
Figure 7:
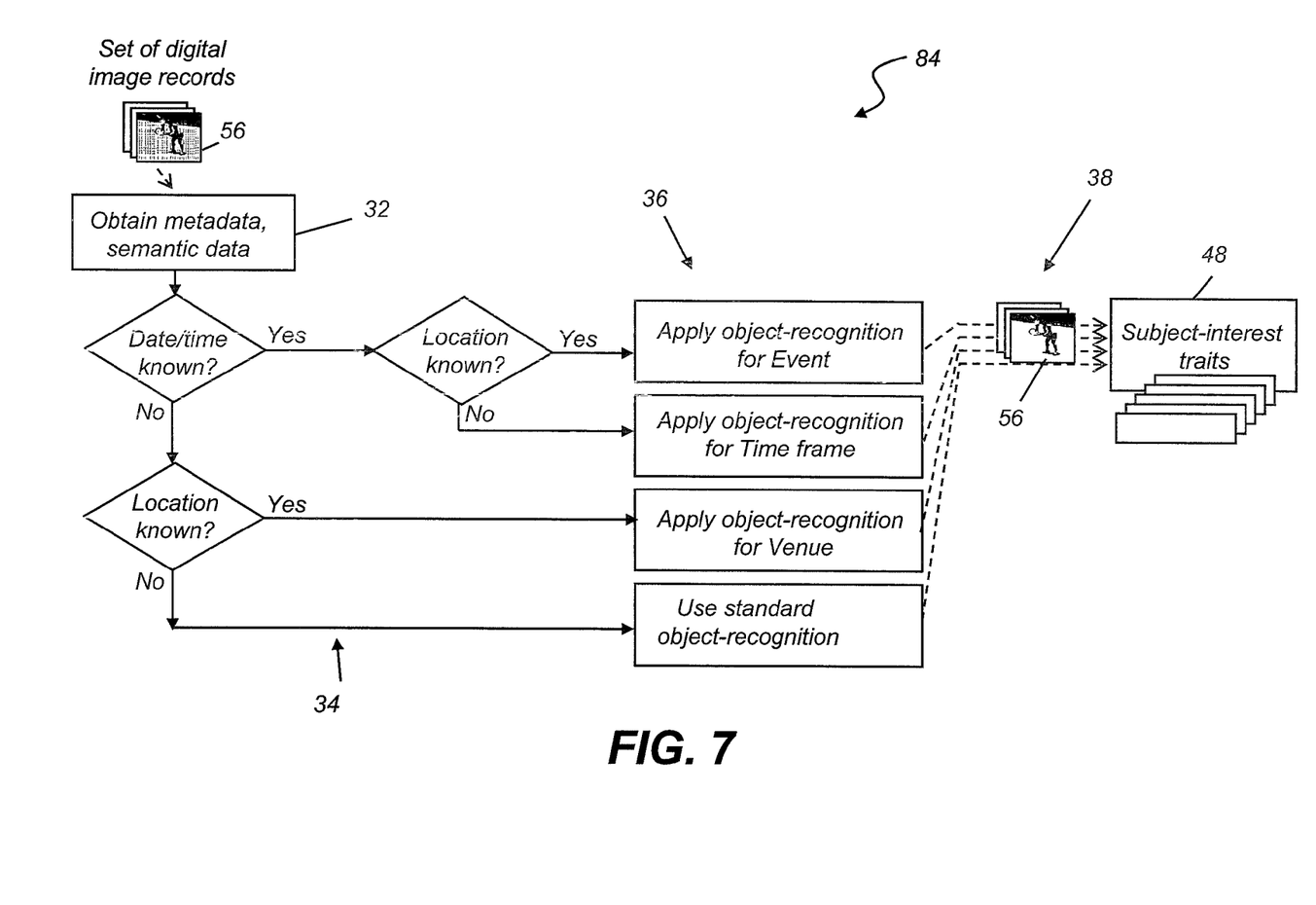
FIG. 7 is a logic flow diagram showing a sequence for using contextual information as part of digital image records analysis in one embodiment.

The processor-accessible memory system 24 includes one or more processor-accessible memories configured to store information, including the information needed to execute the processes of the various embodiments of the present invention, including the example processes of FIGS. 2, 6, and 7 described herein. The processor-accessible memory system 24 may be a distributed processor-accessible memory system including multiple processor-accessible memories communicatively connected to the data processing system 26 via a plurality of computers and/or devices. On the other hand, the processor-accessible memory system 24 need not be a distributed processor-accessible memory system and, consequently, may also include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 24 is shown separately from the data processing system 26, one skilled in the art will appreciate that the processor-accessible memory system 24 may be stored completely or partially within the data processing system 26. Further in this regard, although the peripheral system 30 and the user interface system 28 are shown separately from the data processing system 26, one skilled in the art will appreciate that one or both of such systems may be stored completely or partially within the data processing system 26.

The peripheral system 30 may include one or more devices configured to provide digital image records to the data processing system 26. For example, the peripheral system 30 may include digital video cameras, cellular phones, regular digital cameras, or other computers. The data processing system 26, upon receipt of digital image records from a device in the peripheral system 30, may store such digital image records in the processor-accessible memory system 24.

The user interface system 28 may include a mouse, a keyboard, another computer, or any device or combination of devices from which data is input to the data processing system 26. In this regard, although the peripheral system 30 is shown separately from the user interface system 28, the peripheral system 30 may be included as part of the user interface system 28.

The user interface system 28 may also include a display device 10, a processor-accessible memory, or any device or combination of devices to which data is output by the data processing system 26. In this regard, if the user interface system 28 includes a processor-accessible memory, such memory may be part of the processor-accessible memory system 24 even though the user interface system 28 and the processor-accessible memory system 24 are shown separately in FIG. 1.

Image records, also termed image assets, stored in a digital image-record collection in the processor-accessible memory system 24 may be linked to a variable amount of metadata. This image metadata can include various semantic and structural information related to the conditions under which the image was captured as well as information obtained about image contents. By way of illustration, metadata for a digital image record can include date and time of image capture, the capture location (provided by a Global Positioning Satellite, GPS, for example), camera owner, camera type, image resolution, comments from the operator or viewer of the image, and various data obtained from the image content itself, including information evaluating the subject(s) of the image, for example. Semantic information obtained and stored as one type of supplementary metadata for a digital image record can include various information obtained from objects in the image, including data from image analysis tools known in the art, such as various software applications providing object recognition or face detection or recognition.

Face detection algorithms are well known and have been described, for example, in U.S. Pat. No. 7,218,759 entitled "Face Detection in Digital Images" to Ho et al. and commonly assigned U.S. Pat. No. 7,110,575 entitled "METHOD FOR LOCATING FACES IN DIGITAL COLOR IMAGES" to Chen et al. Face recognition algorithms, also known in the art, then analyze identified face digital image records to find matching faces from one or more detected faces. U.S. Pat. No. 7,142,697 entitled "Pose-Invariant Face Recognition System and Process" to Huang et al. describes the use of model digital image records as tools for training a neural network to recognize faces in digital image records. Object detection algorithms are also known and are familiar to those skilled in the art. For example, a method for object detection in a still image is shown in U.S. Pat. No. 5,640,468 entitled "METHOD FOR IDENTIFYING OBJECTS AND FEATURES IN AN IMAGE" to Hsu et al. An adaptive object detection method for objects in video image data is described in U.S. Pat. No. 6,205,231 entitled "OBJECT IDENTIFICATION IN A MOVING VIDEO IMAGE" to Isadore-Barreca et al.

One step for evaluating a user-subject-interest involves accessing the collection of digital image records associated with the user. The collection of digital image records are stored in processor-accessible memory system 24, which can take any of a number of forms. In one embodiment, the digital image records collection is stored for users who subscribe to an image storage service. This can include, for example, a service such as the Kodak EasyShare Gallery internet site that allows individual users to upload their images to a server for access to others as well as for ordering prints or for sharing.

Another step for evaluating a user subject interest according to various embodiments of the present invention is the provision, accessing, or receipt of one or more content requirements. Content requirements relate to "rules" or patterns that tend to indicate a particular subject interest. For example, content requirements can specify that images of sailboats be detected in the user collection of image records in order to indicate a boating user-subject interest. Additional rules within the content requirements could stipulate that sailboat images be detected at multiple events, indicating an ongoing interest on the user's part. The process of defining a set of content requirements associated with a defined user-subject interest involves making some assumptions that relate image content, image metadata, or semantic data to possible user-subject interests. Accordingly, content requirements oftentimes will be unique or substantially unique to the associated user subject interests. In other words, if the processor-accessible memory system stores a plurality of defined user-subject interests, each subject interest may have associated therewith a set of content requirements. In this case, each set of content requirements may include at least one content requirement that is different than any other or substantially every other set of content requirements.

Content requirements can be provided by a third-party advertiser, for example, who is interested in identifying enthusiasts for a particular activity or product. Alternately, a set of content requirements can be set up by the entity that administers system 22. It is allowable to have content requirements from multiple sources at one time as well as to combine content requirements to extract more information. Content requirements obtained from any of a number of sources can be stored in processor-accessible memory 24.

Evaluating one or more user-subject interests can be one part of an overall process used to generate a user profile that can be used to characterize the user for prospective advertisers, for example. Evaluating one or more user-subject interests could thus be performed as a routine process, possibly with user interest data updated at appropriate times, such as when new images are uploaded or when additional information associated with the user becomes available. Alternately, identification of user subject interests can be performed on an as-needed basis, such as at the request of an advertiser for providing an offer to all users who appear to meet certain criteria, such as having an interest in a particular product area, for example. If a complete user collection is not available, as is the case with a standalone photo kiosk or retail based minilab where only the digital images that the user is interested in at that time are available for a limited amount of time, the system could institute a "running" user profile for each identified user that is updated for user-subject interests whenever the user downloads new images to the kiosk or minilab.

Embodiments of the present invention are directed to evaluating a user's subject interest, e.g., by evaluating one or more traits associated with the subject interest. The phrase "subject interest trait" is used to encompass a broad range of information that tells something about the involvement of a particular user in the user-subject-interest. One basic measure of involvement that is considered a subject-interest trait relates to the apparent level of attraction or enthusiasm a user may have for a user-subject interest.

For example, a user subject-interest may be running. A subject-interest trait, then, provides information about the user's involvement with the corresponding user-subject-interest. An example of a subject interest trait is the user's level-of-interest in the corresponding subject interest, in this case, running. An exemplary user may show a high level of interest, simply because there are numerous data points in user activity that point to this conclusion. Other types of subject-interest traits relate to the user's favorite equipment, such as shoes or apparel, whether or not the user favors being a participant or spectator, or whether there is a favorite event that is associated with the subject interest, for example. In the case of a running user-subject interest, such subject-interest traits may specify that the user likes a particular brand of shoes when running, enjoys running as opposed to watching other runners, and regularly participates in an annual charity race.

Digital image records provide a useful mechanism for obtaining this type of subject-interest trait information. In the runner example, user images and their associated metadata can be analyzed for information such as apparel or shoe manufacture, type of meet participation, how far the user has been willing to travel to participate in a meet, and other subject-interest traits that relate to user involvement with the user-subject interest.

Referring to FIG. 2, there is shown a logic flow diagram of a method for evaluating a defined user-subject interest based on associated content requirements. A defined user subject interest 60 is obtained in a receive user-subject interest step 64. Content requirements 42 are also provided as input to this process, which may be stored in processor-accessible memory system 24 in a receive content requirements step 40. An identification step 44 identifies a set of digital image records 56 from the collection of digital image records, each deemed to have image characteristics in accord with the content requirements 42. Digital image records 56 may be image assets from a user image collection 46, for example.

Identification step 44 may include several substeps that filter out one or more further subsets of digital images that are more likely to be in accord with the user subject interest provided. For example, the step of identifying the set of digital image records 44 may first include identifying a first subset of digital image records from the collection of digital image records, the first subset including fewer digital image records than the full collection of digital image records in user image collection 46, and each record in the first subset having image characteristics in accord with some, but not all of the content requirements 42 associated with the user subject interest 60. Step 44 may then identify the set of digital image records 56 from the first set of digital image records at least by identifying the digital image records in the first set that have image characteristics in accord with all of the content requirements 42. Because the first set has more digital image records than the set 56, the first set is referred to herein as a "superset" of digital image records.

One example of this would be where a user subject interest in grandchildren aims to determine whether the user is a grandparent. To make such a determination, associated content requirements may require that images have both older adults and children therein. However, it may be more efficient for the data processing system 26 to first identify a superset of image records that include older adults and then, from the superset, identify, from the superset, the set of image records 56 that also include children.

Still referring to FIG. 2, an evaluation step 68 analyzes the set of digital image records 56 and evaluates a subject-interest trait 76 associated with user subject interest 60. Examples of subject-interest traits 76 are given in subsequent descriptions. An association step 78 then associates the evaluated subject interest trait 76 with the user subject interest 60 and stores this association in the processor-accessible memory system 24.

The association that is made helps to ascertain and populate the user subject interest 60. Populating the user subject interest 60 connotes not only evaluating the subject interest, but also providing other information, such as providing some quantitative or other indication that can be used in subsequent analysis to determine a relative level of interest or other details about the user's involvement with the user-subject interest, for example.

Figure 3:
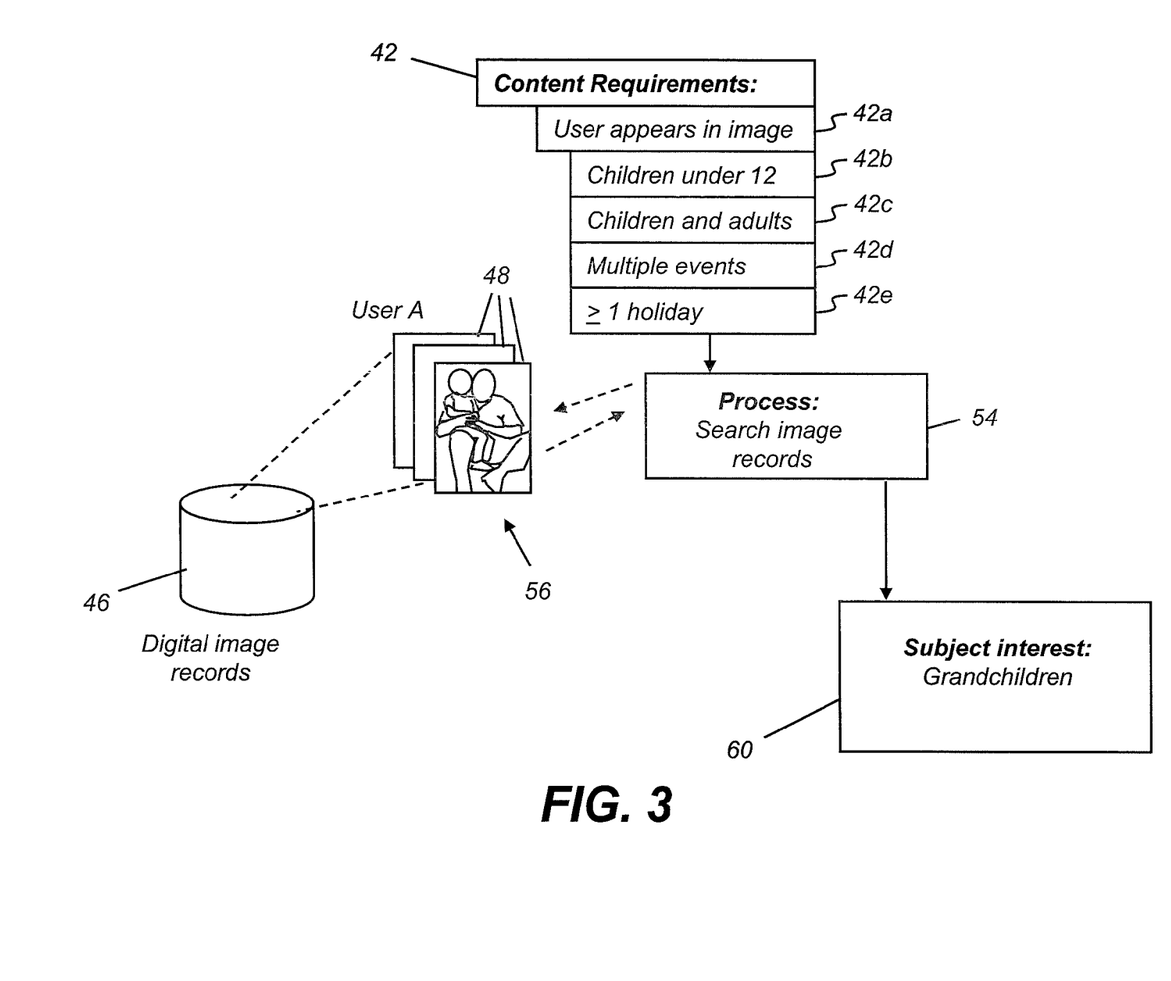
FIG. 3 is a block diagram showing one example of the use of content requirements for obtaining subject interest information according to an embodiment of the present invention.

The block diagram of FIG. 3 shows an example in which content requirements 42 are used to populate user subject interest 60. For this example, an advertiser or other party wants to identify one or more users with a user-subject interest that indicates that they may have grandchildren. This might be used, for example, for an advertiser looking for a base of users who would have particular interest in receiving catalogs or offer information for toys or other items of interest to children. To help to determine this, content requirements 42 stipulate the following:

(i) a requirement 42a that the digital image records 46 in set 56 show the user within the image, as determined by face recognition algorithms, for example;

(i) a requirement 42b that digital image records 46 in set 56 for the user show multiple instances of children under about age 12;

(ii) a requirement 42c that multiple images in set 56 show both children and adults within the same image;

(iii) a requirement 42d that the images in set 56 exhibit requirements (i) and (ii) in multiple events; and (iv) a requirement 42e that the events in (iii) include more than one holiday.

This collection of content requirements 42 goes to a search process 54 that executes identification step 44 of FIG. 2 for image assets within each user account. Still and video image records and other digital image records are searched for meeting the criteria of these content requirements. Where a user has the corresponding subject interest, it can then be populated with traits 76 accordingly. For a user not having any image records that meet the content requirements, the corresponding user-subject interest 60 can be populated with traits 76 that indicate a low level of interest, an unknown level of interest, or possibly no interest. An additional step is performed in evaluating the level of interest the user or someone in the user's profile has in the identified subject interest.

Content requirements 42a-42e in the example of FIG. 3 and in general can be provided from one or more of a number of sources. For example, content requirements could be provided by an advertiser who is interested in obtaining information related to the subject interest. Alternately, content requirements could be provided by a service provider who handles user image record storage and management, or by a third-party developer in response to the needs of an advertiser or other entity and having some knowledge of the types of information that can be obtained and the utilities available for analyzing sets of digital image records.

The example given in FIG. 3 shows how the user subject interest 60 is populated using an analysis of set of digital image records 56 associated with a particular user. Subject-interest traits that are obtained from analysis of images and other digital image records provide more information than is obtained by simply evaluating a user interest. One exemplary association of a subject-interest trait with the subject interest relates to the level of user interest or involvement in subject interest 60. In FIG. 3, for example, the level of interest of this particular user in grandchildren can be learned and then associated with the user subject interest: grandchildren. Whether or not the user accompanies or travels with grandchildren to various locations or visits grandchildren at the same location can be ascertained. Other information such as ages and number of grandchildren can also be obtained as further data to populate this subject interest, for example.

Figure 4:
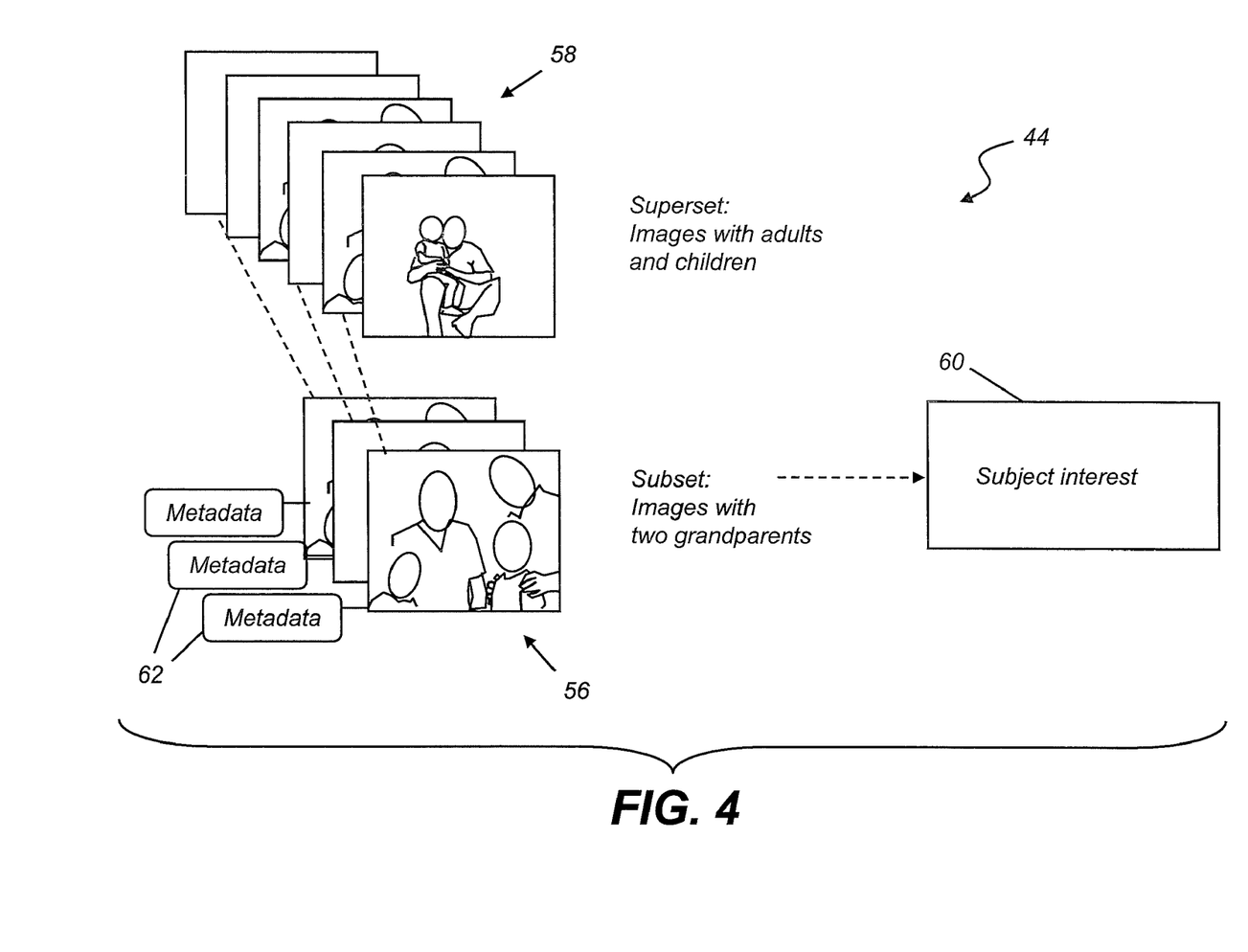
FIG. 4 is a block diagram of an example for obtaining subject interest information from a subset of user image records according to an embodiment of the present invention.

The example of FIG. 4 shows a process for carrying out identification step 44 of FIG. 2. Here, the same content requirements 42 shown in FIG. 3 can be used to examine digital image records from collection 46. Superset 58 of images is initially obtained as a result of this processing. Superset 58 meets the criteria for some of the content requirements 42. In the example of FIG. 4, superset 58 includes images having the user (an adult), another adult, and children under 12 (content requirements 42a, 42b, and 42c) which can be automatically recognized by using face-detection and age-detection algorithms known in the art. Further processing then identifies, from superset 58, a subset 56 of images that appear to have been taken at multiple holidays (examples of events) (content requirements 42d and 42e). By looking at factors such as what events these images were from and locations where they were captured, it can be inferred that the adults are grandparents to the children. In addition to analysis of image content itself, identification of either superset 58 or subset 56 can also be obtained using metadata 62 that is associated with the images. This metadata 62 can include, for example, location information, camera owner, date and time stamp, and other data that is useful for search process 54 (FIG. 3).

Example Using Content Requirements to Identify Subject-Interest Traits

Figure 5:
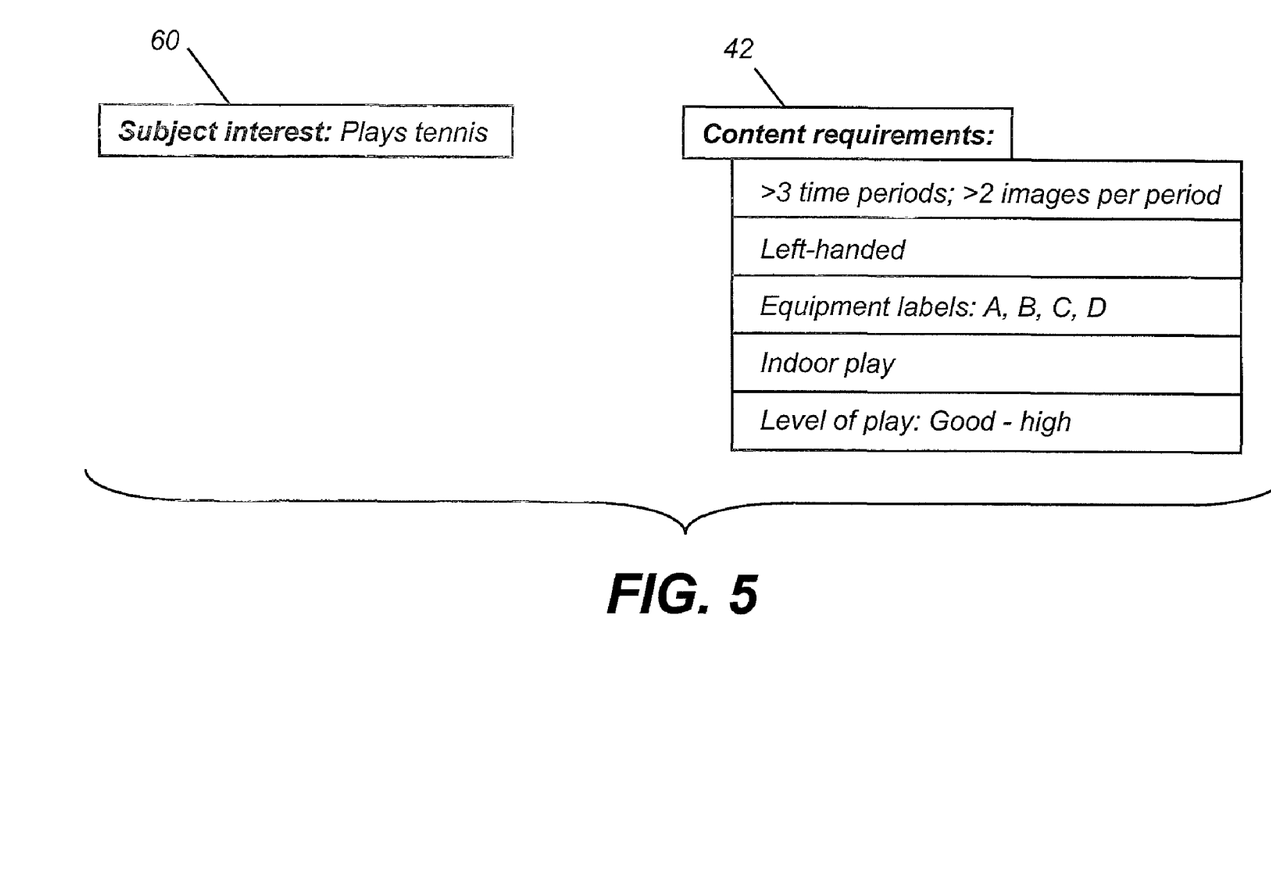
FIG. 5 is a block diagram showing a schema for content requirements related to a subject interest according to an embodiment of the present invention.

FIG. 5 shows an exemplary set of content requirements 42 that relate to a specific user-subject interest 60. For this example, a sports equipment and apparel manufacturer has products targeted to a certain market segment. To address this market segment more effectively, the manufacturer wants to determine not only that a particular person plays tennis, but also meets other requirements that more accurately qualify the player as a good candidate for a promotional offering.

For the example of FIG. 5, the user-subject interest 60 that is defined is that the user plays tennis. In addition to this user-subject interest, there are particular items of data that the advertiser wants to know about this user. This information can be obtained by analyzing a set of images from this user in view of a set of content requirements. Content requirements can be of different types. The particular example shown in FIG. 5 identifies some general types of content requirements that could be used:

(i) Frequency of participation, within the same day and over an interval of time. Content requirements 42 may specify that some minimum threshold be met for apparent involvement in an activity of some kind. In this example, the digital image set can be checked to determine if the user is shown playing tennis at least a certain number of times (3 or more in the FIG. 5 example), and with at least a number of images for each time (2 or more in the example shown).

(ii) A physical characteristic of the user. In this example, the advertiser is interested in finding left-handed players. This particular example is instructive, since the content requirement is only indirectly related to the user-subject interest. It is not likely that this trait would be obtained as part of the profiling process that detects the user-subject interest. That is, the logic used for detecting a tennis enthusiast and including this in a user profile would not likely also seek to determine right- or left-handedness. For this more complex information, some type of image analysis algorithm would be used, employing techniques that would be familiar to those skilled in the imaging arts, such as for detecting player stance, for example.

(iii) One or more identifying features such as symbols, shapes, colors, or logos. The advertiser may be interested in a brand-name shopper or on a person who insists upon or can afford, is aware of, or values a certain high-quality item. As with the example given in (ii) above, this is trait information that would not be likely to be included in a user profile or detected using the same logic that detects a tennis enthusiast. In various embodiments, feature-recognition software of various types is called upon to analyze images in the set of image records in order to identify particular features. In this example, the features of interest are particular to tennis apparel and equipment.

(iv) An environmental factor. In this example, the advertiser is interested in an audience of indoor tennis players or of players who may play both indoors and outdoors. Image variables such as light and color can be used to determine whether or not an image was obtained indoors or out.

(v) A performance characteristic. It is possible to obtain more complex information about a user, such as from analysis of video motion data or other information. In this case, the advertiser has an interest in a user who exhibits at least a certain level of professional play.

The above exemplary listing (i)-(v) is illustrative, but it can be appreciated that many other general types of content requirements could be used for this purpose. For example, there can be geographical information that is related to a subject interest area somewhat indirectly, but reveals a subject-interest trait that can be associated with the user-subject interest for a particular user. As a general observation, it can be seen that the content requirements given in this example help to obtain various subject-interest traits such as tendencies, preferences, or other characteristics that would not be readily obtained from a conventional user profile. For example, it would be unusual to have such considerable, specific information about a user in a user profile. From a perspective such as the advertiser described with reference to FIG. 5, the present invention helps to first screen and identify a subset of users who have one or more user subject-interests. Then, the invention allows improved characterization of that interest by evaluating associated subject-interest traits based at least on an analysis of image record content related to that user.

FIG. 6 presents a logic flow diagram that shows exemplary processing steps for using a method of the present invention in one embodiment. For this example, continuing with the example of FIG. 5, an advertiser specifies user-subject interest 60 and one or more related content requirements 42 in order to identify users who meet certain criteria which make them likely to have interest in a certain product or promotion. An account identification step 80 examines user profile information to identify users who are shown to have the indicated user-subject interest. In this example, step 80 yields two users, labeled Q and R. Both users Q and R have associated digital image records collections 46. For the example of FIG. 5, user profile data for both users Q and R indicate a level of interest in tennis. However, as was described with reference to FIG. 5, more information is desired by the advertiser. The particular types of information are subject-interest traits related to the user-subject interest of "tennis", but requiring more detailed information about user involvement.

A records identification step 82 is executed in order to identify, for users Q and R, the appropriate sets of digital image records 56 from digital image records collection 46 that have image characteristics that are in accord with the given user-subject interest 60 and associated content requirements 42. At a first level, this would mean collecting images that are related to tennis in some way, according to image content or associated image metadata. Once such an initial sort of the images collected together images related to the user-subject interest, then further sorting can be done to identify images that are deemed likely to show the traits of interest and group these images in set 56.

An analysis step 84 is then executed as a type of filtering sequence to analyze image content from set 56 in detail. Among the various tools and utilities available for analysis step 84 are object-recognition utilities.

The content requirements that have been defined can be used to help specify an appropriate set of object-recognition techniques that would be used for analyzing digital image records or characteristics thereof in subsequent processing. This can help to improve processing speed and accuracy of the information obtained. For example, generic object recognition utilities for detecting wheeled vehicles may be able to readily differentiate a bicycle from an automobile or truck, but may have difficulty in distinguishing the bicycle from a motorcycle, or in distinguishing one type of motorcycle from another. Differentiating one type of object from another can be significant for properly identifying subject-interest traits related to a content requirement, as this example suggests. In such a case, it can be seen that having some relevant contextual information would assist in defining the object recognition utilities that are used for analyzing a specific set of digital image records.

For analysis step 84 (FIG. 6), embodiments of the present invention take advantage of contextual information that is available either in metadata that is associated with an image or that readily discernable as semantic information that is stored within the image content itself.

Referring to FIG. 7, there is shown a logic flow diagram for using contextual information as part of analysis step 84 in one embodiment. The process shown in FIG. 7 is directed to providing subject-interest traits 48 that more accurately characterize the user based on the set of digital image records 56 obtained using content requirements. An obtain data step 32 obtains metadata or semantic data that can be used to relate one or more images in the image set 56 to a particular event. Events have various associated contextual data; for example, events are known to have happened at a particular time and at a particular location. As just one illustrative example, it can be determined that a set of digital image records were obtained at a nationally known car race, such as at a key NASCAR event, for example. Both the time and location of an event such as this is known, and images having the same time and place information corresponding to this data can be themselves associated with the racing event. This knowledge can then be used in analysis step 84 in order to help determine which image object-recognition utilities are most appropriately or effectively used for digital image records within the set. For example, given the NASCAR event described earlier, object recognition utilities can be developed or fine-tuned in order to detect a specific interest in a particular car, driver, or sponsor. Similarly, theme park attendance during a gymnastics competition can be readily ascertained from metadata associated with one or more images in the set of digital image records. Knowing this information about the set of digital image records can be used to select object-recognition software that targets content requirements relating to specific subject-interest traits for sport activities, equipment types, and apparel, for example. The diagram of FIG. 7 shows this process as an object-recognition selection step 36.

Both time and place information needed to identify an event to which the digital image records can be associated may not be available for a particular set of digital image records. A contextual information determination step 34 checks for this information in appropriate metadata or semantic data from the set of digital image records 56. Where both date/time and location information are available, object-recognition utilities suitable for the event can be used, rather than more general object-recognition utilities.

The logic followed in contextual information determination step 34 is fairly straightforward and enables some more suitable selection of object-recognition utilities to be made wherever at least one of time/date or location data can be determined.

Location or other venue data may be used in a similar manner to event data for targeting a subset of the object recognition utilities that would be of particular value. For example, digital image records obtained in a particular National Park or at a particular location might indicate that feature recognition utilities be used to help detect objects such as trail signs, hiking gear, boating or rafting equipment, and other items appropriate to that site. As another example, digital image records known to have been captured at a Caribbean vacation site suggest feature-recognition utilities for cruise ships, hotels, spas, deep-sea diving, or other appropriate subject elements.

In a similar manner, date and time information, without corresponding location data, may be indicative of the types of object-recognition routines that would be most appropriate when analyzing the set of digital image records identified for the user. Digital image records known to have been obtained on dates associated with particular holidays suggest the use of certain types of object-recognition utilities. For example, patriotic holidays suggest various types of object-recognition utilities, such as for fireworks, parade apparel and equipment, and the like. As these examples suggest, a full date and time stamp can be of further value for selecting object-recognition tools that are best suited for indoor or outdoor settings or for images obtained under full daylight or other lighting conditions. Religious or familial holidays suggest other types of object recognition utilities related to gift-giving, decorations, ceremonies, and other types of image subject elements.

Still referring to FIG. 7, a processing step 38 applies the selected group of object-recognition utilities for analysis of the set of digital image records 56. In this way, embodiments of the present invention can take advantage of available information on either or both the location and date/time of image capture that is associated with the set of digital image records that has been identified from the collection of digital image records, in order to more effectively focus the job of analyzing these digital image records. Object-recognition utilities can be appropriately targeted so that they efficiently serve the analysis function, thereby reducing the likelihood of false or incorrect information.

Still referring to FIG. 6, a populating step 86 then forms a populated user-subject interest 90 for each user, associating it with the detected subject-interest traits and storing these results for use. With user interest information populated in this way, an optional product offering step 88 or other action can be taken by the advertiser who has used subject-interest and subject-interest trait information in order to "qualify" users for a promotion.

The entity that controls and manages storage of user accounts can exercise a level of control over how much personal information is provided, effectively "screening" inquiries from an advertiser, rather than allow open access to stored user information. In one embodiment, the advertiser or other inquiring entity informs the storage entity as to what type of user the advertiser is looking for. The storage entity then executes the steps shown in FIG. 6, deriving a suitable set of content requirements 42 for the user-subject interest 60 without involvement of the advertiser or other third party. The storage entity then provides, as output, identifying information on users who meet certain subject-interest and trait criteria.

It can be appreciated that a number of possible arrangements between entities are possible with embodiments of the present invention. For example, a service provider may contract with an account management system that maintains user accounts and, in turn, accept contracts with outside entities interested in obtaining trait information. A fee is collected in one embodiment before product offering step 88 (FIG. 6) can be executed.

Content requirements themselves can be generated by an entity that desires access to stored information about users, or can be generated by an entity that is charged with storage and management of data that is related to and/or owned by the user. In one embodiment, content requirements are received from a processor-accessible memory system that stores a plurality of defined user-subject-interests, each having a predefined set of content requirements associated with it.

As shown in the example of FIG. 5, content requirements may have only an indirect relationship to the subject-interest itself, and may be specific to the type of information that is desired. Sets of content requirements can be customized for particular user-subject interests or for particular uses. Thus, where there are multiple stored sets of content requirements, each set of content requirements can include at least one content requirement that is different than every other or substantially every other set of content requirements.

Figure 8:
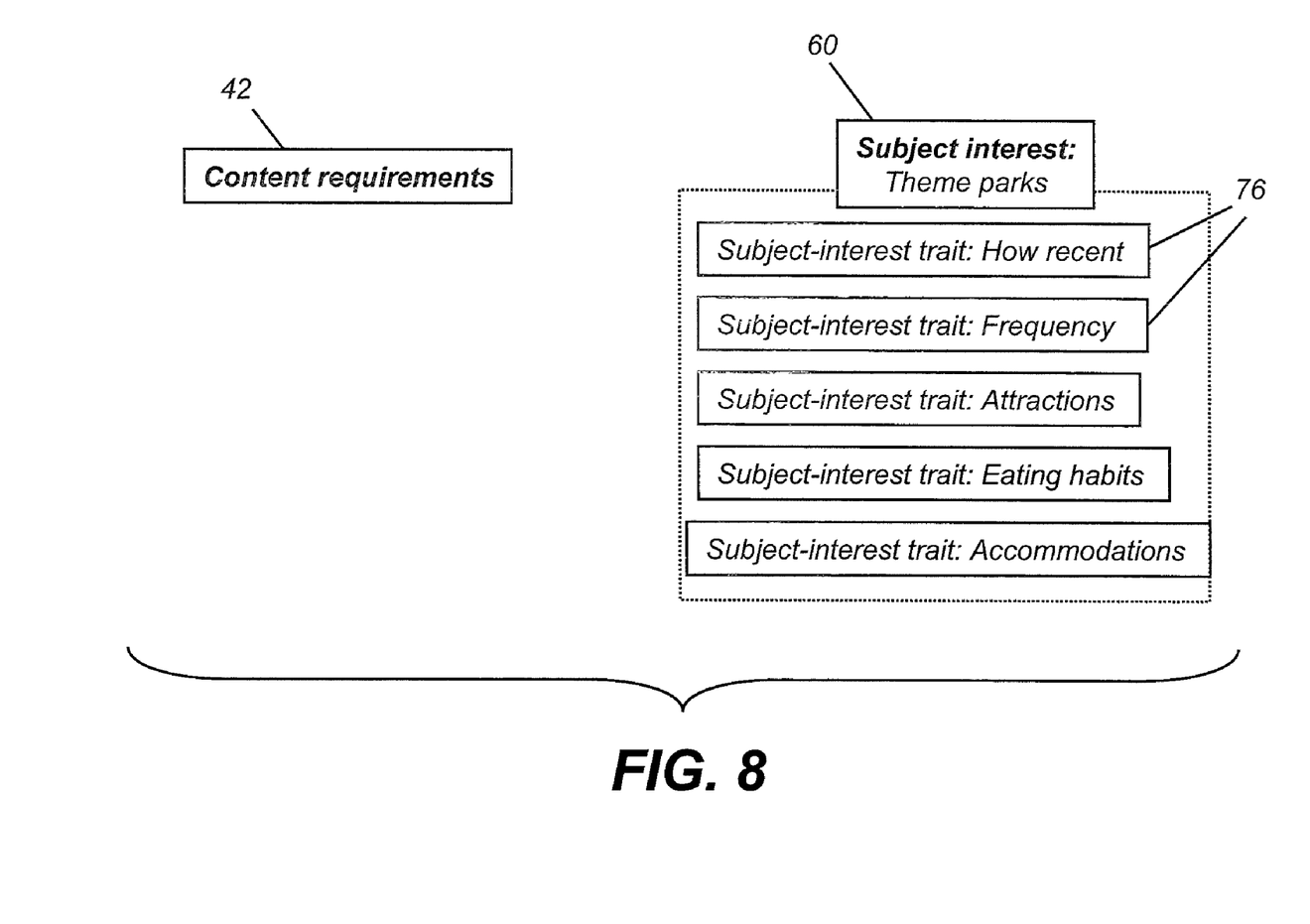
FIG. 8 is a block diagram showing a schema for a query of content requirements related to a subject interest according to an embodiment of the present invention.

In another embodiment, an inquiring entity may provide content requirements that obtain a variable amount of trait information, rather than present qualifying rules or thresholds for filtering or excluding certain users. FIG. 8 shows how a subject interest 60 is populated in one embodiment in which variable information related to the user-subject interest 60 is provided in its associated subject-interest traits 76. In this example, theme park attendance is the overall user-subject interest 60. A particular content requirement in this case could be to have images that are associated with a specific theme park, such as Epcot™, for example. Where this content requirement is satisfied, the associated image records are likely to have information that helps to show additional information related to this user-subject interest. A significant number of images that meet this content requirement, particularly over multiple time periods, would tend to indicate a high level of interest in this particular theme park. It could be determined, for example, that this particular theme park is a favorite among theme parks visited recently by an enthusiastic user. Alternately, information gleaned from images taken at multiple theme parks could provide other information as subject-interest traits. For example, a particular user may have a special interest in thrill rides, high-tech rides, or other attractions or entertainment venues. User patterns, ascertained from image content and metadata, can indicate user-subject interest traits such as whether or not the user stays overnight, what types of restaurants or areas are visited, and what types of purchases have been made at such locations. This type of information, gleaned from a user's digital records collection as described herein, could have value to an online advertiser or other party.

Continuing with the example shown in FIG. 8, subject interest traits 76 that are obtained from analyzing user digital image records can help to characterize the user subject interest 60 with more granularity. Thus, for instance, it can be useful for an advertiser to target one type of offer to users who show frequent theme park attendance in the past, but not within the last year. An advertiser may want to tailor an offering differently for users who are more likely to stay overnight at the theme park. In yet another example, an advertiser can customize an offering to a user based on past patterns of behavior as indicated by the subject-interest traits associated with the defined user-subject interest.

Similar logic can also be used to find location types or categories (for example, beaches, amusement parks, national parks, museums, historical sites, foreign travel, etc.). The subject-interest traits would define the level of detail that is of interest (i.e. U.S. beaches within past 5 yrs during the month of July, eastern U.S. amusement parks within past 3 yrs, etc.).

Figure 9:
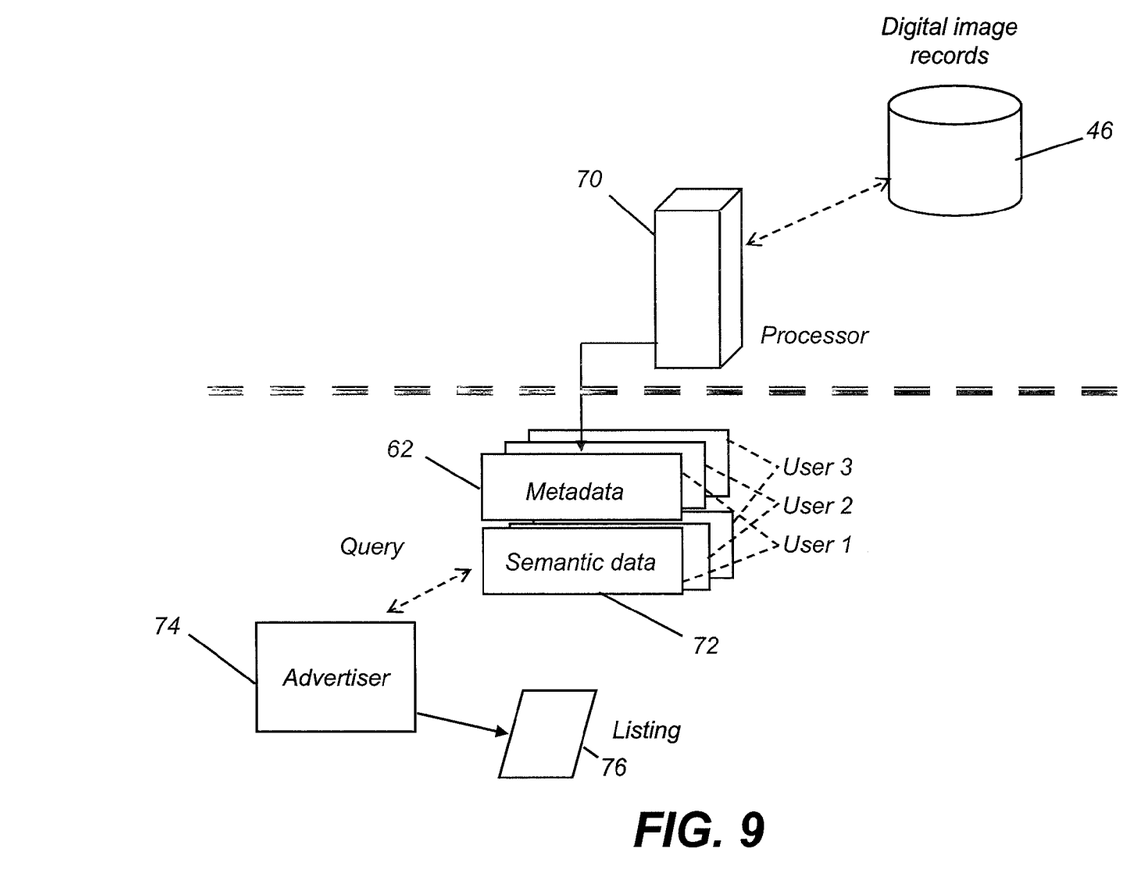
FIG. 9 is a block diagram showing one model scheme for providing semantic data and metadata to an outside party such as an advertiser according to an embodiment of the present invention.

Embodiments of the present invention allow a number of variations for making data about the user's image collection available to advertisers and other parties. Referring to FIG. 9, one possible scheme is outlined. Here, a server 70 maintains user digital image records collections 46. The collections themselves are not accessible to an advertiser 74 or other outside entity, but are protected by server 70, as indicated by the bold dotted line in FIG. 9. Upon agreement and payment from advertiser 74, semantic data 72 and metadata 62 from one or more user digital image records collections 46 are made available for query. Using this model, advertiser 74 provides the search algorithms needed to obtain information about user-subject interests for the owner of a digital image records collection 46 from the semantic data (including image content data) 72 and metadata 62. Advertiser 74 can then generate a listing 76 of accounts of interest for providing a promotional offer or otherwise reaching with a targeted advertising message. The provider of this service, through server 70, can make metadata 62 and semantic data 72 accessible in a standard, published format that allows advertiser 74 to employ custom applets or other programmed techniques for access. Further security can be provided with such a scheme, so that only account numbers are provided as identifiers to the advertiser, rather than revealing personal identification data. The advertiser can then contract with the image data storage provider to send offers or targeted messages, or otherwise make this information available to account users.

In another scheme, the owner of server 70 can automatically generate user profiles or other information that characterizes user account owners based on their images. This information can be provided to advertisers 74 in some manner, with variable protection available for security and privacy of the account owner.

As a result of this processing for evaluating a user subject interest, information on the user-subject interest and associated user-subject traits can be provided to an advertiser or other third-party entity. Embodiments of the present invention can be part of a transaction, by which a fee is received from the advertiser or other third-party entity. Various transaction arrangements can be set up, including a process in which receipt of the fee is verified prior to transmission of the generated information about a user.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

PARTS LIST

10. Display
12. Digital image
22. System
24. Processor-accessible memory system 26. Data Processing System
28. User Interface System
30. Peripheral System
32. Obtain data step
34. Contextual information determination step
36. Object-recognition selection step
38. Processing step
40. Receive content requirements step
42, 42a, 42b, 42c, 42d, 42e. Content requirements
44. Identification step
46. Digital image records collection
48. Subject-interest trait
54. Search process
56. Set of digital image records
58. Superset
60. User subject interest
62. Metadata
64. Receive user subject interest step
68. Identification step
70. Server
72. Semantic data
74. Advertiser
76. Subject-interest trait
78. Association step
80. Account identification step
82. Records identification step
84. Analysis step
86. Populating step
88. Product offering step
90. Populated subject interest

The invention claimed is:

1. A method for identifying users with existing user profiles that meet a criteria for an advertiser comprising the steps of:
receiving a subject of interest from the advertiser;
receiving a set of content requirements from the advertiser, the set of content requirements being associated with the subject of interest received from the advertiser, and the set of content requirements stipulating a set of additional conditions for the subject of interest;
using a data processor to identify a set of users who have an interest in the subject of interest based at least upon their individual user profile;
selecting a set of digital image records associated with a user from the identified set of users;
using the set of content requirements to select a subset of digital image records that fulfill at least one of the set of additional conditions for the subject of interest;
identifying contextual information associated with the subset of digital image records of the user;
using the content requirements and the contextual information to analyze the subset of digital image records to determine if the user meets the advertiser's criteria; and
storing an indication of this determination in processor accessible memory.

2. The method of claim 1 further comprising the step of transmitting a set of identified users that meet the criteria to the advertiser.

3. The method of claim 1 wherein the content requirements are generated by a storage entity without involvement of the advertiser.

4. The method of claim 1 wherein the content requirements are not related to the subject of interest but specify further criteria for identifying the set of users for the advertiser.

* * * * *